United States Patent
Liang et al.

(10) Patent No.: US 7,099,299 B2
(45) Date of Patent: Aug. 29, 2006

(54) CDMA SYSTEM WITH FREQUENCY DOMAIN EQUALIZATION

(75) Inventors: Ying-Chang Liang, Santa Clara, CA (US); Francois Chin Po Shin, Singapore (SG); Appukuttan Nair Saraswathy Amma Madhukumar, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1051 days.

(21) Appl. No.: 10/090,370

(22) Filed: Mar. 4, 2002

(65) Prior Publication Data

US 2003/0165131 A1   Sep. 4, 2003

(51) Int. Cl.
*H04B 7/216* (2006.01)
*H04L 12/28* (2006.01)

(52) U.S. Cl. ............... 370/342; 370/441; 375/146; 375/147

(58) Field of Classification Search ............... None
See application file for complete search history.

(56) References Cited

U.S. PATENT DOCUMENTS

| | | | |
|---|---|---|---|
| 6,188,717 B1 * | 2/2001 | Kaiser et al. | 375/148 |
| 6,876,694 B1 * | 4/2005 | Komatsu | 375/148 |
| 2002/0097697 A1 * | 7/2002 | Bae et al. | 370/335 |

* cited by examiner

*Primary Examiner*—Duc Ho
(74) *Attorney, Agent, or Firm*—Lawrence Y. D. Ho & Assoc's.

(57) ABSTRACT

A code division multiple access (CDMA) system and methods for processing symbol blocks of a spread signal in both frequency and time domains are described. A transmitter (10) of the CDMA system spreads pilot symbols and data of the symbol blocks to derive a spread sequence. Thereafter, the spread sequence is extended with a predetermined number of chips and pulse shaped for transmission as the spread signal. A receiver (400) of the CDMA system receives the spread signal, removes the predetermined number of chips and then orthogonally transforms the spread signal to the frequency domain to derive a transformed signal. The transformed signal is equalized in the frequency domain to derive an equalized signal. The equalized signal is then inverse orthogonally transformed to an output in the time domain. The output is then despreaded to derive the symbol blocks.

45 Claims, 6 Drawing Sheets

CDMA SYSTEM WITH FREQUENCY DOMAIN EQUALIZATION

FIELD OF THE INVENTION

The present invention relates to wireless code division multiple access (CDMA) communication systems. In particular, this invention relates to wireless communication transceivers in CDMA communication systems.

BACKGROUND OF THE INVENTION

Direct sequence code division multiple access (DS-CDMA) is one of the effective wireless access technologies that supports high capacity, variable and high data rate transmission services in wireless communication systems. DS-CDMA has been adopted in third generation wireless communications systems.

Existing DS-CDMA systems are single carrier transmission systems. Two kinds of receivers are generally applied for such DS-CDMA systems namely, Rake receivers and time-domain equalization (TDE) receivers. The performance of these receivers depends on the properties of the wireless environment in which such receivers operate. Because of multipath delay spread of a wireless channel, inter-finger interference (IFI) and multiple access interference (MAI) are inherent with Rake receivers. On the other hand, TDE receivers, though theoretically capable of suppressing IFI and MAI, suffer from slow convergence and complicated computations when applied in DS-CDMA systems. Furthermore, TDE receivers are not able to suppress IFI and MAI effectively in practice.

Multicarrier transmission schemes have been proposed as an effective way to improve channel capacity utilization under multipath interference and frequency selective fading reception caused by multipath delay suppression. Orthogonal frequency division multiplexing (OFDM) is an effective multicarrier modulation scheme to combat the frequency selectivity of a channel using a simple one-tap equalizer. OFDM prevents inter-symbol interference (ISI) and inter-carrier interference (ICI) by inserting a cyclic prefix (CP) between adjacent OFDM symbols. Moreover, the signal can be transmitted and received using fast Fourier transform WEFT) devices without increasing transmitter or receiver complexities.

Uncoded OFDM transmission technique applied in a multipath environment has a bit error rate (BER) comparable to that of a narrow band radio channel because the fading of each sub-carrier is frequency non-selective. To overcome this behavior and to reduce the BER, a combination of OFDM and CDMA, called multicarrier CDMA (MC-CDMA), has been proposed recently. In MC-CDMA system, the energy of each information symbol is spread over several sub-carriers, which leads to a diversity gain in a broadband-fading channel. However, similar to any multicarrier modulation scheme, MC-CDMA suffers from two major implementation difficulties. First, high peak-to-average power ratio (PAPR) problem is inherent with MC-CDMA. Hence, highly linear and inefficient amplifiers must be used to avoid distortion and spectral spreading. Second, MC-CDMA is sensitive to the frequency offset and RF phase noise. These two issues limit the applicability of MC-CDMA in practical wireless environment.

In downlink communication of CDMA systems, all mobile stations within the same cell or sector make use of the same frequency band and same time slot but different spreading codes for data transmission. Spreading codes consist of two layers of codes, namely long scrambling codes and short channelization codes. The long scrambling codes are common for all mobile stations within the same cell or sector. However, the mobile stations are allocated unique short channelization codes that are orthogonal to each other. To support multi-data rate transmissions, two spreading methods may be used, namely multi-code (MC) and orthogonal variable spreading factor (OVSF) methods.

Communication channels allocated for transmissions to dedicated mobile stations are referred to as downlink traffic channels (DTCHs). In order to establish and maintain the connections between the base stations and mobile stations, a common pilot channel (CPICH) and a common control channel (CCPCH) are also allocated to each cell or sector for conveying relevant information shared by all mobile stations within the same cell or sector. Data symbols to be conveyed by DTCHs, CPICH and CCPCH are orthogonally spread, synchronously multiplexed, and transmitted through the same wireless channel. In multi-data rate transmissions, the orthogonality of the spreading codes for low- and high-data rate channels, and the spreading codes for CPICH and CCPCH are maintained.

Where there are many obstacles such as buildings and hills between a base station and a mobile station, a wireless channel is well modeled as a wide-sense stationary uncorrelated scattering (WSSUS) channel. In a CDMA downlink transmission, a transmitted signal arrives at a mobile station as several time-delayed, amplitude-scaled versions of the transmitted signal along multiple paths. The CDMA receiver of the mobile station resolves the multipath components of the transmitted signal into several paths known as rays. The rays have time delays that are multiples of the spreading chip interval $T_c$, and a resolved ray with time delay $\tau$ represents a group of multipath rays with time delays over the interval $[\tau-T_c/2, \tau+T_c/2]$. If there is only one resolved ray, a frequency non-selective fading channel is observed. However, if there is more than one resolved ray, a wireless channel is called a frequency selective fading channel.

For a frequency non-selective fading channel, informational data may be recovered at the mobile station using a simple despreader without any intracell interference. Practically, however, a wireless channel is a frequency selective fading channel because of large time dispersion of the multipath components. Conventionally, a CDMA receiver in the mobile station employs a Rake combiner to coherently combine despread outputs from all resolved rays of a transmitted signal that are determined by a path searcher, thereby recovering the transmitted signal.

In order to improve the performance of CDMA downlink transmissions, receivers that suppress IFI and MAI are needed. When a delay spread is large, the frequency selective fading channel may be transformed into a frequency non-selective fading channel through channel equalization. Therefore, a channel equalized receiver seems to be an effective CDMA receiver to recover transmitted data by restoring the orthogonality of spreading codes used, thus suppressing both IFI and MAI.

A CDMA system with a conventional TDE receiver requires a large number of filter taps because of the high chip rate of such a CDMA system. The large number of filter taps causes noise to increase and a convergence problem when implemented with adaptive algorithms. A least mean square (LMS) algorithm is not applicable to acquire equalizer coefficients because of the typically long convergence time of this algorithm. Algorithms that converge faster, such as recursive least square (RLS) may be too complex for applications with large number of equalization taps. If an adaptive algorithm diverges, or converges slowly, it will be difficult to achieve the suppression of IFI and MAI desired in an equalization receiver.

In order to suppress the multipath delay spread, multicarrier modulation is applied to increase the symbol duration by splitting a high-rate serial stream into multiple parallel low-rate streams. Each of the multiple parallel low-rate streams is modulated using a different sub-carrier. Orthogonal frequency division multiplexing (OFDM) is an effective multi-carrier modulation scheme because of its efficient digital implementation through FFT and inverse FFT (IFFT) and the orthogonality of the sub-carriers, even though such sub-carriers overlap. By inserting a cyclic prefix (CP) for each OFDM block, the inter-symbol interference (ISI) can be suppressed as long as the CP length is greater than the maximum excess delay of the channel.

A conventional TDE receiver for CDMA downlink transmissions typically includes a cell searcher, a code generator, a path searcher, a despreader, an equalizer, and a signal detector. The cell searcher receives, from a CDMA downlink system, a transmitted signal and the corresponding rays, and retrieves long scrambling codes and information relating to a cell from the transmitted signal. The code generator uses the long scrambling codes, generates a combination of long scrambling codes and short channelization codes, known as spreading codes, for CPICH, CCPCH and the DTCHs required by the equalizer. The path searcher then uses data symbols of the CPICH, the long scrambling codes, the short channelization codes, and the received chip signals, to provide time delay information of several rays with the largest received powers.

Generally, a chip signal from a physical channel j passes into a corresponding FIR filter of the equalizer to thereby produce a filtering output. A signal combiner then sums outputs from each FIR filter generating a signal z(n) for further processing by the despreader. Coefficients of the equalizer can be obtained, for example, by minimizing the difference, in minimum mean-square-error (MMSE) sense, between the overall equalization output z(n) and delayed version of the transmitted signal, x(n−u), where u is called the reference timing. The path searcher provides reference timing required by the equalizer during operation.

The despreader then despreads the output of the equalizer using the spreading codes from the code generator and allocated to an intended mobile station. The signal detector then recovers informational data for the intended mobile station from the output of the despreader.

Conventional equalization receiver chooses the FIR filter length G being greater than or equal to the subchannel length L, so that the energy from all taps of the channels can be captured. Only one long equalizer is required if G is chosen by this way, and the minimum number of total equalizer coefficients is ML, which can be very large for wireless mobile environment.

An equalization receiver with, large number of filter taps involves noise enhancement and convergence problem when implemented with adaptive algorithms. In fact, LMS ("least mean square") algorithm is not applicable to acquire the equalizer coefficients, because of the typically long convergence time of this algorithm. Algorithms that converge faster, such as RLS ("recursive least square"), may be too complex for applications with large number of equalization taps. If the adaptive algorithm diverges, or converges slowly, it will be difficult to achieve the suppression of IFI and MAI, which is the very beginning object of an equalization receiver.

A multicarrier modulation scheme is robust to frequency-selective fading. However, the multicarrier modulation scheme has severe disadvantages such as difficulty in sub-carrier synchronization and sensitivity to frequency offset and nonlinear amplification. This is because multicarrier modulation uses a lot of subcarriers with overlapping power spectra and exhibits a non-constant nature in its envelope. By combining multicarrier modulation with CDMA, the symbol rate in each sub-carrier can be lowered so that longer symbol duration makes it easy to quasi-synchronize the transmissions. In other words, MC-CDMA spreads the original signal using a given spread code in the frequency domain. For MC-CDMA, it is essential to have frequency non-selective fading over each sub-carrier. Therefore, if the original symbol rate is high enough to become subject to frequency selective fading, the signal needs to be converted from serial to parallel before spreading over the frequency domain.

A transmitter for an MC-CDMA system is similar to that used in normal multi-carrier modulation except that, in normal multi-carrier modulation, the same symbol is transmitted in parallel through different sub-carriers. The input information sequence, r(m), is first converted into M parallel data sequences, s(n,0), s(n,1) . . . s(n,M−1), where n is the symbol number. Then each serial-to-parallel converter output is multiplied with the spreading code of length G, d(n,0), d(n,1) . . . D(n,N−1). All the data corresponding to the total number of sub-carriers (N=M×PG) are modulated in baseband by inverse discrete Fourier transform (IDFT) and converted back into serial data.

A cyclic prefix of length p is inserted between symbols to alleviate inter-symbol interference caused by multipath fading. The input information sequence, now a modulated prefixed baseband spread signal, is finally transmitted after radio frequency upconversion. After down-conversion and perfect synchronization, the cyclic prefix is removed. The data is converted from serial to parallel and N sub-carrier components, corresponding to the received data (y(n, k), where k=1, 2, . . . N), is coherently detected with DFT and, thereafter, equalized with the help of pilot assisted channel estimation. The equalization process combines the energy of the received signal scattered in frequency domain. The transmitted information sequence is recovered with the help of a despreading module using the spread code.

For conventional single carrier DS-CDMA systems, both Rake and TDE receivers are associated with inter-finger interference (IFI) and multiple access interference (MAI), which limit the capacity of the system.

MC-CDMA suffers from two major implementation difficulties. First, high peak-to-average power ratio (PAPR) problem is inherent with MC-CDMA, hence, highly linear (and inefficient) amplifiers must be used to avoid distortion and spectral spreading. Second, MC-CDMA is very sensitive to the frequency offset and RF phase noise. These two issues limit the applicability of MC-CDMA in practical wireless environment.

Therefore, what is clearly needed is a CDMA system that is based on single carrier modulation with improvements to both MAI and IFI suppression due to multipath delay spread.

SUMMARY OF THE INVENTION

The present invention seeks to provide a code division multiple access (CDMA) system having at least one CDMA transmitter and at least one CDMA receiver, a method for transmitting a spread signal by the CDMA transmitter, and a method for processing the spread signal received by the CDMA receiver.

Accordingly, in one aspect, the present invention provides a code division multiple access (CDMA) system comprising:
  at least one CDMA transmitter having:
    at least one spreader for spreading a packet having one or more blocks to derive an M×G spread sequence for each of the blocks to thereby form a spread signal, where M represents number of symbols, the number being greater or equal to one, each of the at least one spreader having a processing gain of G; and
    a sequence extender for extending each of the blocks using a predetermined number of chips to thereby form an extended spread signal, the sequence extender having an extender input coupled to the spreader output.

In another aspect, the present invention provides a method for transmitting signals in a code division multiple access (CDMA) system, the method comprising the steps of:
  spreading, by at least one spreader, a packet having one or more blocks to derive an M×G spread sequence for each of the blocks to thereby form a spread signal, where M represents number of symbols, the number being greater or equal to one, each of the at least one spreader having a processing gain of G; and
  extending, by a sequence extender, the M×G spread sequence using a predetermined number of chips to thereby form an extended spread signal, the M×G spread sequence being received from a spreader output of each of the at least one spreader.

In still another aspect, the present invention provides a code division multiple access (CDMA) system comprising:
  at least one CDMA receiver for processing a received signal, the CDMA receiver having:
    a sequence extension remover for removing a predetermined number of chips from at least one predetermined position of the received signal to thereby form a modified signal;
    an orthogonal transform block, coupled to the sequence extension remover, for transforming the modified signal in a first domain to form a transformed signal in a second domain;
    an equalizer block, coupled to the transform block and having a channel estimator, for equalizing the transformed signal to thereby reduce channel distortion and form an equalized signal;
    an inverse orthogonal transform block, coupled to the equalizer block, for inverse transforming the equalized signal to form an output in the first domain; and
    a despreader for despreading the output to thereby derive a group of symbols.

In yet another aspect, the present invention provides a method for processing a received signal received in a code division multiple access (CDMA) system, the method comprising the steps of:
  removing a predetermined number of chips from at least one predetermined position of the received signal to thereby form a modified signal;
  orthogonally transforming the modified signal in a first domain to form a transformed signal in a second domain;
  equalizing the transformed signal to thereby reduce channel distortion and form an equalized signal;
  inverse orthogonally transforming the equalized signal to form an output in the first domain; and
  despreading the output to thereby derive a group of symbols.

BRIEF DESCRIPTION OF THE DRAWINGS

Preferred embodiments of the present invention will now be more fully described, by way of example, with reference to the drawings of which.

DETAILED DESCRIPTION OF THE DRAWINGS

A code division multiple access (CDMA) system having at least one CDMA transmitter and at least one CDMA receiver, a method for transmitting signals by the CDMA transmitter, and a method for processing a received signal received by the CDMA receiver in accordance with preferred embodiments of the invention are described. In the following description, details are provided to describe the preferred embodiments. It shall be apparent to one skilled in the art, however, that the invention may be practiced without such details. Some of these details may not be described at length so as not to obscure the invention.

There are many advantages of the invention. One advantage of the invention is that the CDMA system is robust against multipath delay and inter-finger interference (IFI) compared with existing Direct Sequence (DS) CDMA systems with Rake structures.

Another advantage of the invention is that, compared with existing single-carrier CDMA systems with time-domain equalisation schemes, the CDMA receiver is simpler to implement and does not change significantly with the length of channel response.

A further advantage of the invention is that, as a single carrier system, the CDMA system does not have the problems of high peak-to-average power ratio and high sensitivity to frequency offset and radio frequency (rf) phase noise common in multicarrier systems.

Yet another advantage of the invention is that a common pilot structure for downlink transmissions in the CDMA system improves pilot assisted channel estimation.

Still another advantage of the invention is provided by a novel data dependant pilot structure for downlink transmissions by the CDMA transmitter. This data dependant pilot structure has constant amplitude for pilot symbols in the frequency domain that enables easier channel estimation. In addition, as a result of pilot chips being placed at every symbol block, the time-varying nature of a channel can be estimated more effectively. Furthermore, as the position of pilot chips based upon the data dependant pilot structure changes with each symbol block, issues related to deep sub-carrier fading and noise amplification can be minimized compared with existing CDMA systems having fixed positions for pilot chips.

Yet another advantage of the invention is that frequency domain equalisation enables the CDMA receiver to have a simplified structure that can be implemented using off-the-shelf components for both Fast Fourier Transform (FFT) and inverse Fast Fourier Transform (FFT) operations.

Overall, the CDMA system is a single carrier cyclic prefix-based CDMA system that overcomes the disadvantages of DS-CDMA and communication systems having multicarrier modulation schemes.

Figure 1:
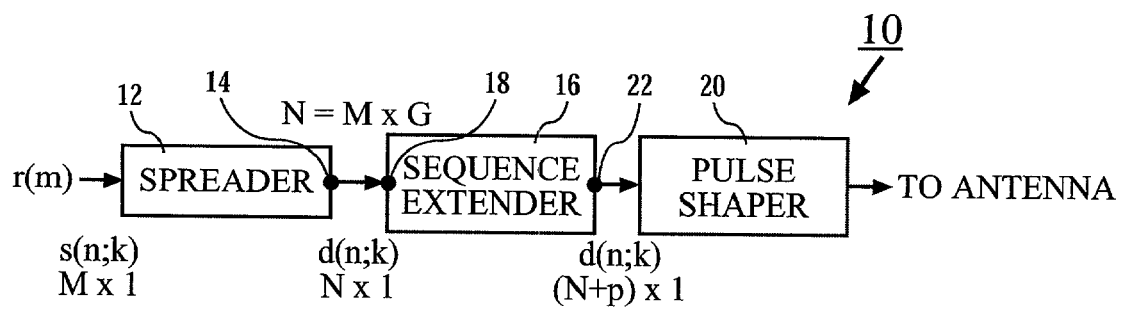
FIG. 1 illustrates a functional block diagram of a code division multiple access (CDMA) transmitter in accordance with the present invention.

Referring now to FIG. 1, a functional block diagram of a CDMA transmitter 10 is illustrated. The CDMA transmitter 10 comprises a spreader 12 having a spreader output 14, a sequence extender 16 having an extender input 18 and a pulse shaper 20. The spreader output 14 is coupled directly to the extender input 18. The sequence extender output 22 is coupled to the pulse shaper 20.

Input to the spreader 12, r(m), is provided as a high rate serial data symbol. This input is first segmented into a packet with different symbol blocks, s(n;k), wherein each of the symbol blocks has a block size of M symbols where M≧1 and n is the block number. The symbols for each block, s(n;k), k=0, . . . ,M−1, is then spread using spreading codes assigned to a user. The spreader has a spread code length or processing gain of G. A block chip sequence d(n;k), with chip block size N, where N=M×G is generated by the spreader 12 at the spreader output 14. The M×G spread sequence is then provided to the extender input 18.

Thereafter, the sequence extender 16 extends each block by a predetermined number of chips to eliminate or at least alleviate the inter-finger interference (IFI). Output from the sequence extender 16 increases the block size to (p+N) chips.

Each chip block in the cyclic-prefixed (p+N) spread sequence is then passed to the pulse shaper 20 with a specified roll-off factor. The cyclic-prefixed (p+N) spread sequence is then transmitted out of the CDMA transmitter 10. For multiple users, the data is spread using orthogonal spread codes corresponding to each of the multiple users and added together before the insertion of cyclic prefix.

Figure 2:
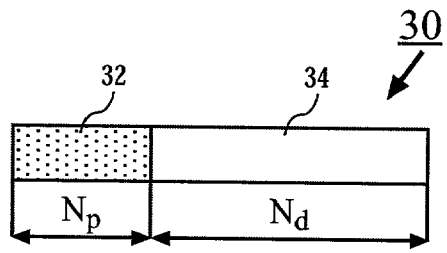
FIG. 2 illustrates a packet structure for data transmissions with dedicated pilots by the CDMA transmitter of FIG. 1.

The packet that is transmitted has a packet structure that depends on whether the spread signal is transmitted as an uplink transmission or a downlink transmission. The packet comprises symbol blocks having one or more pilot blocks and one or more data blocks. For an uplink transmission, location of the pilot blocks and the data blocks within a packet for a symbol block 30 is shown in FIG. 2. As each uplink transmission corresponds to a single user, the pilot blocks 32 and the data blocks 34 are spread with a spread code corresponding to that user. Therefore, in a multi-user environment, dedicated pilot blocks and data blocks are spread with user-specific spread codes corresponding to users in that environment.

Figure 3:
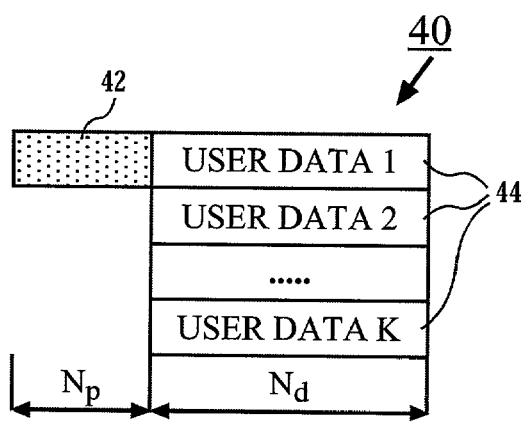
FIG. 3 illustrates a packet structure for data transmissions with common pilots by the CDMA transmitter of FIG. 1.

For downlink transmissions, common pilot symbols can be used for all users in the multi-user environment. The CDMA system in which the CDMA transmitter 10 operates supports both data independent and data dependent pilot symbols. A packet 40 having data independent pilot symbols is shown in FIG. 3. In this packet 40, these pilot symbols are placed together as an orthogonal frequency division multiplexing (OFDM) block 42 and is common to data symbols 44 for all users. Data symbols 44 and pilot symbols in the OFDM block 42 for each of the users are individually spread with user-specific spread codes. A transmitted symbol in this packet structure can be represented as follows:

$$d(t) = \begin{cases} c_p(t)s_p(t) & \text{for pilot symbol period} \\ \sum_{k=1}^{K} c_k(t)s_k(t) & \text{for data symbol period} \end{cases} \quad (1)$$

where $c_p$, $s_p$, $c_k$ and $s_k$ are the pilot spread code, the pilot symbol, the user spread code and the data symbol, respectively. Even though an extra spread code is allocated for transmission of the pilot symbols as the pilot spread code, channel estimation and synchronization using this scheme is more effective since the effect of MAI is minimal during transmission of the pilot symbols.

For the packet 40 for data independent pilot symbols described in the above, channel state information is obtained during the transmission period of the pilot symbol. For the data transmission period, a decision-directed method can be used to update channel estimates.

Figure 4:
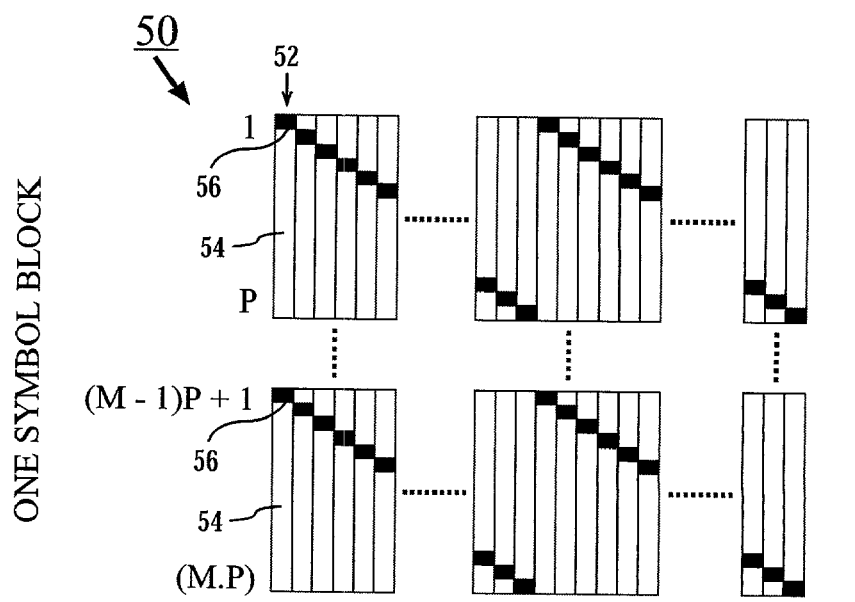
FIG. 4 illustrates a packet structure for transmissions with data dependent pilots by the CDMA transmitter of FIG. 1.

An example of a packet 50 with a new packet structure for data dependent pilot symbols is shown in FIG. 4, wherein each OFDM symbol block 52 has only a few pilot symbols with a limited number of pilot chips. The pilot symbols in the new packet structure depends on user data 54 to be transmitted and exploits certain features of the Fast Fourier Transform (FFT) matrix that is to be used when processing a spread signal, received from the CDMA transmitter 10, using frequency domain equalization. The pilot symbols are generated in the frequency domain and later converted back to the time domain and time-multiplexed with spread data. Unlike the packet 40 for data independent pilot symbols, every block for the new packet structure has a data dependent pilot symbol with pilot chips. The pilot chips 56 for the block 52 is based upon the data 54 for that block 52. Hence:, for a better channel estimate, the position of pilot chips in the new packet structure changes for each block of symbols. This eliminates the possible noise enhancement in frequency domain equalization.

Since this packet structure is designed for downlink or multicode transmissions, the user data 54 in the packet structure corresponds to the sum of spread data for all users. Using the new packet structure, the amplitude spectrum of pilot symbols does not depend on frequency. Consequently, channel estimation error is frequency independent. More details on pilot symbol generation are discussed in the following paragraphs. For the following equations, bold letters serve as matrices (upper case) and vectors (lower case). All other variables are scalars.

Pilot symbols are generated in the frequency domain after an FFT operation on time-domain spread signals. Consider the pilot symbols generated in the frequency domain as a product of a scalar value α and spreading vector g, a column vector whose length is equal to the processing gain, G. Let p be the symbol vector in time domain corresponding to α, and d is the sum of spread data of all users. The frequency domain symbol T can be represented as $$T = F\begin{pmatrix} p \\ d \end{pmatrix} = \begin{bmatrix} \alpha.g \\ D \end{bmatrix}, \quad (2)$$

where F(.) is the FFT operation and D is the frequency domain representation of the sum of spread data. The position of individual elements in pilot vectors α and p can be determined by selecting suitable rows and columns in the FFT matrix. With this flexibility, we can even place pilot chips in suitable sub-carriers that do not encounter deep fades. Consider the decomposition of FFT matrix into several subspace matrices. Equation (1) can be re-written as follows.

$$F\begin{pmatrix} p \\ d \end{pmatrix} = \begin{bmatrix} A & B \\ A_1 & B_1 \end{bmatrix}\begin{bmatrix} p \\ d \end{bmatrix} = \begin{bmatrix} \alpha.g \\ D \end{bmatrix} \quad (3)$$

and, hence α.g=Ap+Bd.

The pilot vector p in time domain can be derived using the following expression.

$$p = A^{-1}(\alpha.g - Bd) \quad (4)$$

where p is a pilot vector in the time domain, g is a known spreading sequence for channel estimation, d is the sum of spread data of all users, α is a scalar value based upon data in the blocks, and A and B are sub-matrices derived from Fast Fourier Transform based upon positions of p and g.

However, this pilot construction does not consider issues related to peak to average power ratio and the ratio of average pilot power to data power. For an efficient implementation of the CDMA transmitter 10, the CDMA system should have minimum peak to average power ratio. In addition, average data power and average pilot power should be nearly same. These two constraints are separately considered and the conditions are derived as follows.

For minimum peak to average power ratio, consider the FFT subspace matrix $$C = \begin{bmatrix} A \\ A_1 \end{bmatrix}$$

and D=

$$D = \begin{bmatrix} B \\ B_1 \end{bmatrix}.$$

Equation (2) can be re-written as:

$$T = F\begin{pmatrix} p \\ d \end{pmatrix} = \begin{bmatrix} C & D \end{bmatrix}\begin{bmatrix} p \\ d \end{bmatrix} = Cp + Dd \quad (5)$$

Using equation (4), $$T = CA^{-1}(\alpha.g - Bd) + Dd \quad (6)$$
$$= \alpha.gCA^{-1} + (D - CA^{-1}B)d$$
$$= [CA^{-1}(D - CA^{-1}B)d]\begin{bmatrix} \alpha.g \\ 1 \end{bmatrix}$$

T is an N×1 matrix, where N is the number of sub-carriers. Consider $$[CA^{-1}(D - CA^{-1}B)d] = \begin{bmatrix} E_0 \\ E_1 \end{bmatrix},$$

where the matrices $E_0$ and $E_1$ are derived from matrices A, B, C and D. $E_0$ corresponds to the first sub-carrier (matrix order 1×2) and $E_1$ correspond to the remaining N–1 (matrix order (N–1)×2) sub-carriers. Thus, Equation (6) becomes $$T = \begin{bmatrix} E_0 \\ E_1 \end{bmatrix}\begin{bmatrix} \alpha.g \\ 1 \end{bmatrix} \cong \begin{bmatrix} \beta_0 \\ \beta_1 \\ M \\ \beta_{N-1} \end{bmatrix} \quad (7)$$

Here $\beta_0$ is the output of the first sub-carrier frequency, generated from the matrices $E_0$ and $$\begin{bmatrix} \alpha.g \\ 1 \end{bmatrix}.$$

To maintain minimum peak-to-average power ratio for transmitted symbols, a large $|\beta_0|^2$ and a small $$\sum_{i=1}^{N-1} |\beta_i|^2$$

is required. That is, $$\max_\alpha \frac{|\beta_0|^2}{\sum_{i=1}^{N-1} |\beta_i|^2} = \max_\alpha \frac{(\alpha.g \quad 1) * (E_0^H E_0)\begin{pmatrix} \alpha.g \\ 1 \end{pmatrix}}{(\alpha.g \quad 1) * (E_1^H E_1)\begin{pmatrix} \alpha.g \\ 1 \end{pmatrix}} \quad (8)$$

To find the optimum value of α, a generalized Eigen decomposition (GED) GED($E_0^H E_0$, $E_1^H E_1$) is performed, and the maximum Eigen vector $$\begin{pmatrix}\delta\\\Delta\end{pmatrix}$$

is obtained where $$\alpha = \frac{\delta}{\Delta}.$$

Simulations were conducted for studying the effect of peak-to-average power ratio. These simulations regarded the g vector from orthogonal Walsh-Hadamard transform. The results of these simulations significantly match theoretical predictions.

For good transmissions within the CDMA system, average signal power for both data and pilot symbols should be equal. The following section explains the minimum conditions required for keeping equal average signal power for both data and pilot.

Let $N_p$ and $N_d$ be the number of pilot symbols and data symbols, respectively. If average signal power for both data and pilot are nearly same, it can be expressed as $$\frac{|p|^2}{N_p} \cong \frac{|d|^2}{N_d}.$$

From equations (3) and (4), $$|A^{-1}(\alpha \cdot g - Bd)|^2 \cong \frac{N_p}{N_d}|d|^2 \qquad (9)$$

$$|(A^{-1})^H A^{-1}|||\alpha \cdot g - Bd|^2 \cong \frac{N_p}{N_d}|d|^2$$

$$|\alpha \cdot g - Bd|^2 \cong \frac{N_p}{N_d}\frac{|d|^2}{|A^{-H}A^{-1}|} = |r|^2$$

Hence for a given g, B and d, select $\alpha$ such that $|\alpha \cdot g - Bd|^2$ is nearest to $r^2$. The value of $\alpha$ changes from symbol to symbol and is purely determined by the sum of spread data of all users in each sub-carrier. However, the value of $\alpha$ can be tracked upon reception of a spread signal by assuming that channel values does not change significantly across symbols. This can be explained mathematically as given below.

Ignoring the presence of white noise, a received spread signal at frequency domain equalization for $n^{th}$ symbol can be expressed as $Y(n)=H(n)T(n)$, where $H(n)$ and $T(n)$ are the frequency response of the channel and the frequency domain representation of $n^{th}$ transmitted symbol, respectively. $T(n)$ is defined in equation (2).

Using the previous relations and using similar subspace notations, $Y(n)$ can be rewritten as:

$$Y(n) = \begin{bmatrix}Y_0(n)\\Y_1(n)\end{bmatrix} = H(n)\begin{bmatrix}\alpha_n \cdot g\\D(n)\end{bmatrix} \text{ for } n^{th} \text{ symbol and} \qquad (10)$$

-continued $$Y(n+1) = \begin{bmatrix}Y_0(n+1)\\Y_1(n+1)\end{bmatrix}$$

$$= H(n+1)\begin{bmatrix}\alpha_{n+1} \cdot g\\D(n+1)\end{bmatrix} \text{ for } (n+1)^{th} \text{ symbol}$$

where $Y_0(n+1) = H(n+1) \cdot g \cdot \alpha_{n+1}$

From equation (10), the value of $\alpha$ for $(n+1)^{th}$ symbol can be determined as follows:

$$\alpha_{n+1} = \frac{1}{N_p}\frac{\sum_{j=1}^{N_p}\hat{H}_j^*(n+1)g^*Y_{0,j}(n+1)}{\sum_{j=1}^{N_p}|\hat{H}_j(n+1)|^2} \qquad (11)$$

where $\hat{H}(n+1)$ is the estimated frequency response of the channel vector. Assuming channel will not change significantly across symbols, consider $\hat{H}(n+1)=\hat{H}(n)$ and determine the value of $\alpha$. However, if the fading is faster, the CDMA system requires frequent channel estimation/correction.

Figures 5A, 5B:
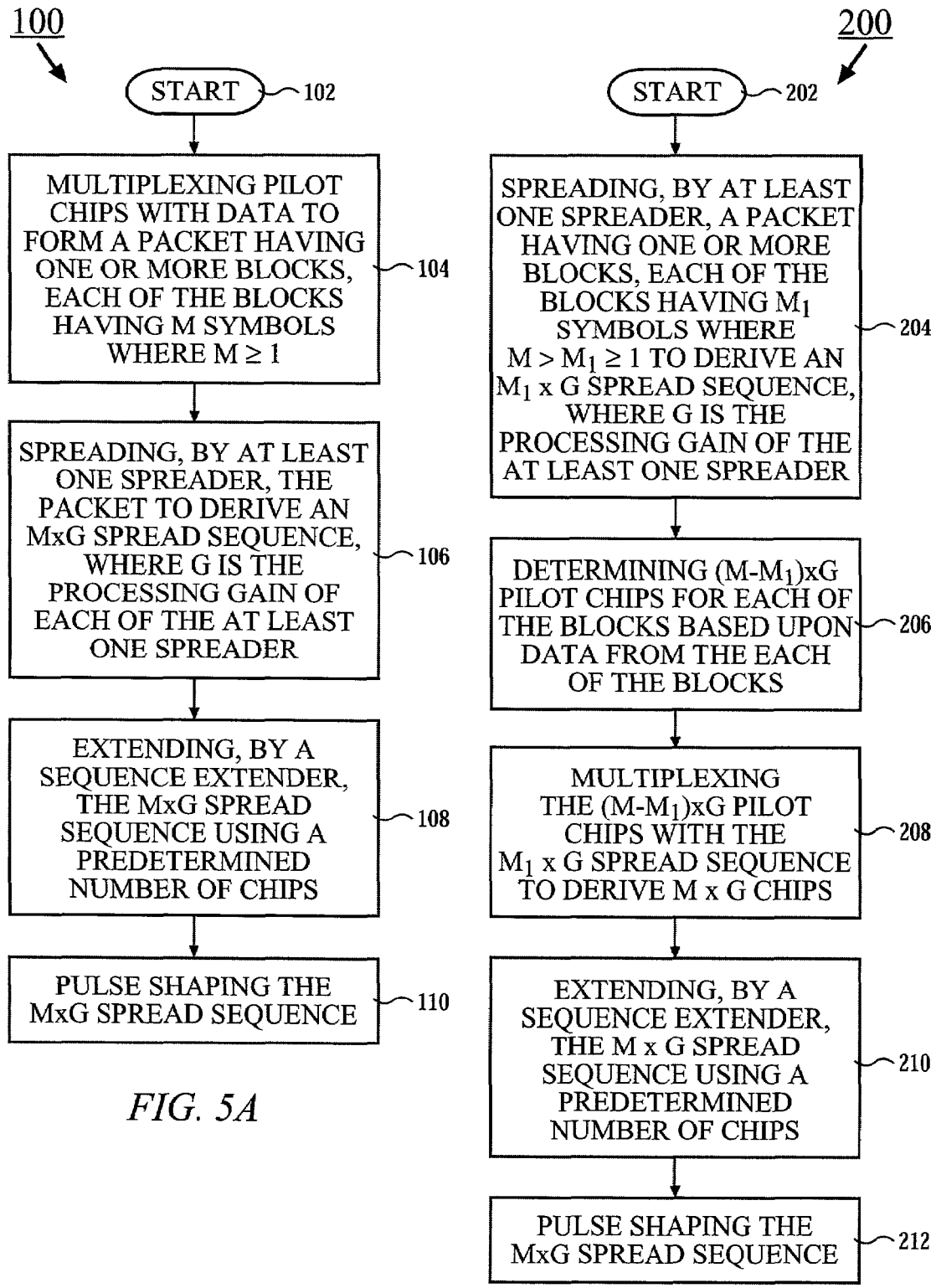
FIG. 5A and FIG. 5B are two flowcharts for two methods of processing data for transmission by the CDMA transmitter of FIG. 1.

FIG. 5A and FIG. 5B are two flowcharts for two methods 100,200 of processing data for transmission by the CDMA transmitter 10. The method 100 applies to data independent pilot symbols and starts 102 with the step 104 of multiplexing a plurality of pilot chips with data of a packet. Thereafter, at step 106, the spreader 12 spreads each of one or more blocks of the packet to derive an M×G spread sequence, where M represents number of symbols and is greater or equal to one, and G is the processing gain of the spreader 12. At step 108, the sequence extender 16 extends the M×G spread sequence using a predetermined number of chips, p to a (p+N) spread sequence, where N=M×G. The method 100 ends with shaping of the (p+N) spread sequence by the pulse shaper 20 at step 110.

For data dependent pilot symbols, the method 200 starts at step 202 and proceeds to step 204 at which the spreader 12 spreads one or more blocks of a packet to derive an $M_1$×G spread sequence for each of the blocks, where for $M_1$ is greater or equal to one and represents number of symbols in each of the blocks, $M_1$<M (M being total number of symbols per block), and G is the processing gain of the spreader 12. In this method 200, pilot chips for a block is determined at step 206 based upon data of that block where total number of pilot chips is (M–$M_1$)×G. Thereafter, at step 208, the plurality of pilot chips is multiplexed with data of the packet as indicated in the packet 50 of the new packet structure. A (p+N) spread sequence, where p is a predetermined number of chips and N=M×G, is derived from the step 210 of extending by the sequence extender 16. The method 200 ends with shaping of the (p+N) spread sequence by the pulse shaper 20 at step 212.

The method 200 for data dependent pilot symbols differs from the method 100 for data independent pilot symbols in how the plurality of pilot chips is determined and multiplexed with user data. In the method 200, the plurality of pilot chips is determined based upon user data and then equally spaced within the packet 50 in the multiplexing step 208.

It is to be noted that although one spreader 12 has been described, it is possible for more than one of the spreader 12 to be used in the CDMA transmitter 10. In such a case, output from each spreader 12 is summed and provided to the sequence extender 16. Hence, the spreading step 106 and the spreading step 204 includes a summation step when more than one of the spreader 12 is required.

Figure 6A:
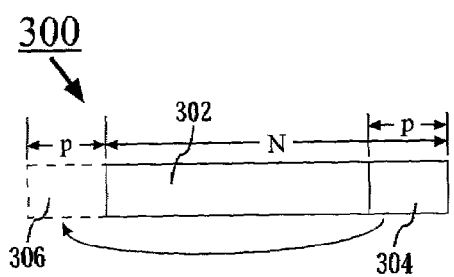
FIG. 6A, FIG. 6B, FIG. 6C and FIG. 6D are examples of extending a spread sequence in the flowcharts of FIG. 5A and FIG. 5B.

Extending the M×G spread sequence in the above methods 100,200 involves what is known in the art as cyclic prefixing. FIG. 6A illustrates a cyclic prefixing technique 300 in which a block 302 has a predetermined number of p chips taken from a tail portion 304 and prefixed in front of the block 302 at a front portion 306. FIG. 6B illustrates another cyclic prefixing technique 320 in which a block 322 has a predetermined number of p chips inserted as zeros after the block 322 at a portion 324.

Figure 6C:
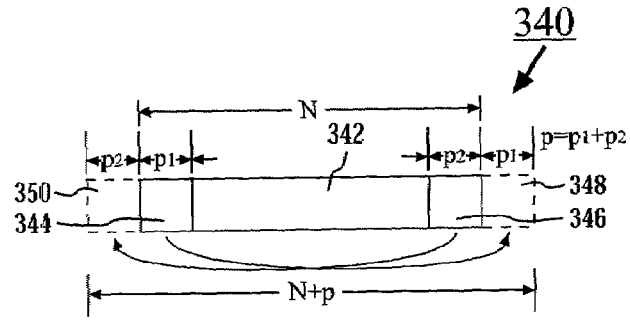
Figure 6B:
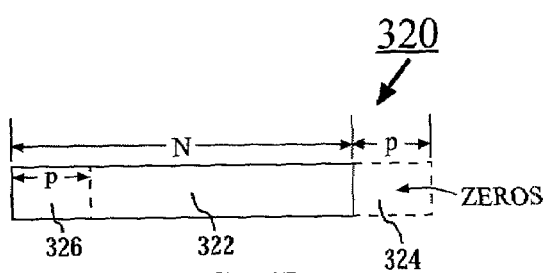

FIG. 6C illustrates a cyclic e)tending technique 340 in which a block 342 has a predetermined number of p chips taken from both a head portion 344 and a tail portion 346 of the block 342. The chips from the head portion 344 and the tail portion 346 are then placed, respectively, at opposite end portions 348,350 of the block 342. Specifically, in this cyclic extending technique 340, $p_1$ chips are taken from the head 344 to extend the block 342 at the opposite end portion 348. In addition, $p_2$ chips are taken from the tail portion 346 to extend the block 342 at the opposite end portion 350.

Figure 6D:
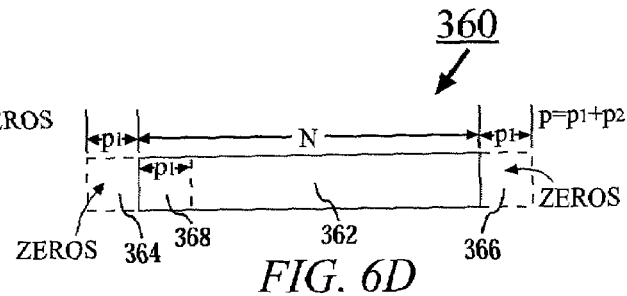

FIG. 6D illustrates another cyclic extending technique 360 in which a block 362 has zeros inserted before and after the block 362. Specifically, $p_1$ chips as zeros are inserted at a front portion 364 and $p_2$ chips as zeros are inserted at a tail portion 366.

Figure 7:
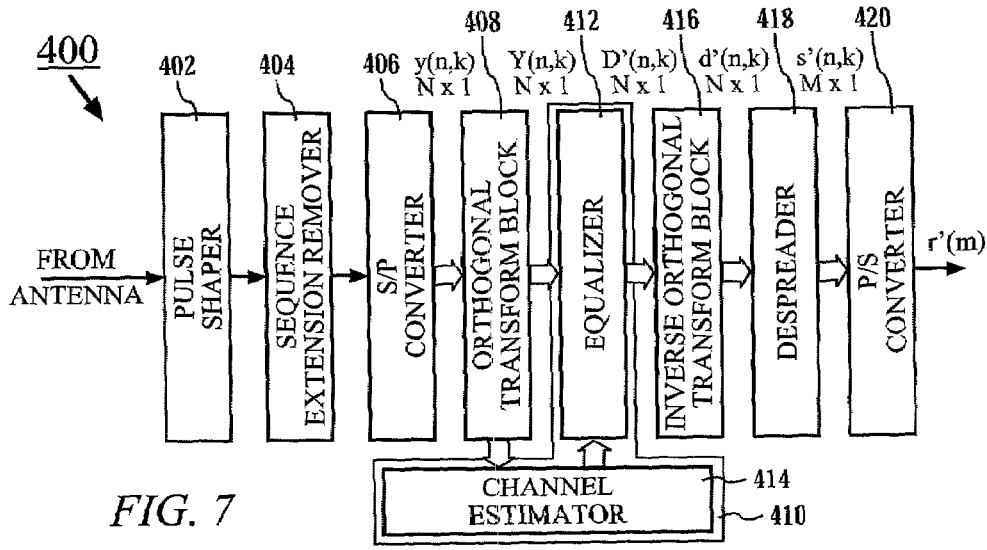
FIG. 7 illustrates a functional block diagram of a CDMA receiver in accordance with the present invention.

Referring now to FIG. 7, a functional block diagram of a CDMA receiver 400 for the CDMA system is illustrated. The CDMA receiver 400 comprises a pulse shaper 402, a sequence extension remover 404, a serial-to-parallel (S/P) converter 406, a transform block 408, an equalizer block 410 having a frequency domain (FD) equalizer 412 and a channel estimator 414, an inverse transform block 416, a despreader 418 and a parallel-to-serial (P/S) converter 420.

In the preferred embodiment of the invention, the transform block 408 is a Fast Fourier Transform (FFT) block and the inverse transform block 416 is an Inverse Fast Fourier Transform (IFFT) block.

A signal from the CDMA transmitter 10 is received and passed to the pulse shaper 402. Filtered by the pulse shaper 402, the sequence extension remover 404 then removes a predetermined number of chips, p, from at least one predetermined position of the received signal to thereby form a modified signal. As described earlier for the CDMA transmitter 10, this p predetermined number of chips was inserted to extend the M×G spread sequence prior to transmission of the received signal. In the case of the cyclic prefixing technique 300, the predetermined number of chips, p, is removed from the front portion 306. In the case of the cyclic prefixing technique 340, the predetermined number of chips, $p_1$ and $p_2$, is removed from both opposite end portions 348,350, respectively.

In the case of the cyclic prefixing technique 320, the sequence extension remover 404 removes the zeros from the tail portion 324. These zeros are then added to a starting portion 326 of the block 322. The starting portion 326 to which the zeros are added has the same number of chips as the number of zeros removed.

As for the cyclic extending technique 360, the zeros are removed from the front portion 364 and the tail portion 366. However, in this cyclic extending technique 360, only the zeros from the tail portion 366 are added to a starting portion 368 of the block 362. The starting portion 368 to which the zeros are added has the same number of chips as the number of zeros removed from the tail portion 366.

Figure 8:
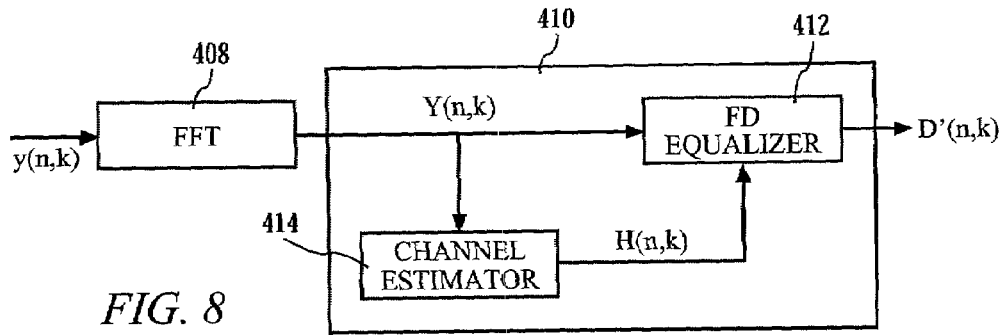
FIG. 8 illustrates a functional block diagram of a frequency domain equalizer with frequency response channel estimation for the CDMA receiver of FIG. 5.
Figure 9:
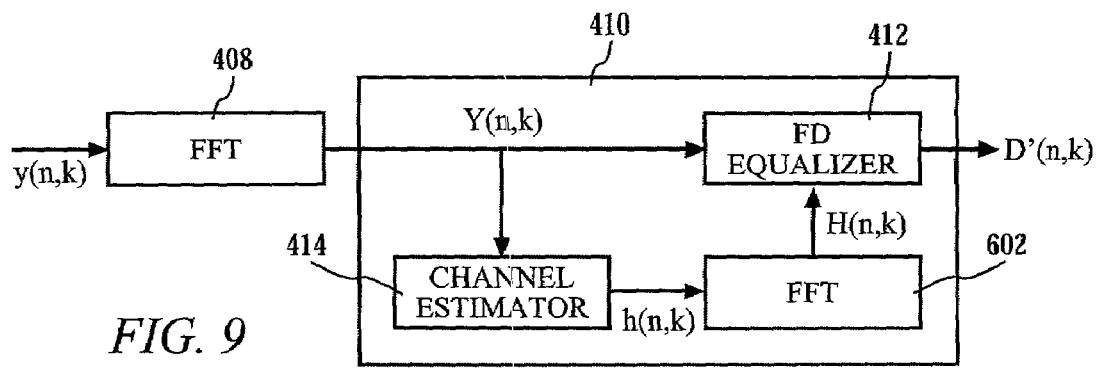
FIG. 9 illustrates a functional block diagram of a frequency domain equalizer with time response channel estimation for the CDMA receiver of FIG. 5.

Upon removing the predetermined number of chips, the sequence extension remover 404 generates a chip block sequence y(n;k), k=0, . . . , N−1. The chip block sequence is then passed to the equalizer block 410. Channel estimation by the channel estimator 414 within the equalizer block 410 is either in the frequency domain or the time domain. FIG. 8 and FIG. 9 illustrate functional block diagrams of the channel estimator 414 providing channel estimations in the frequency domain and the time domain, respectively. In the time domain channel estimator 414 of FIG. 9, the equalizer block 410 comprises a transform block 602 from which a frequency domain channel estimation is provided to the FD equalizer 412 based upon a time domain output from the channel estimator 414.

The output from the transform block 408 is given by:

$$Y(n; k) = H(n; k)D(n; k) + W(n; k) \tag{12}$$

where $$H(n; k) = \sum_{l=0}^{L-1} h(n; l)e^{-j2\pi\frac{kl}{N}} \tag{13}$$

$$D(n; k) = \frac{1}{\sqrt{N}} \sum_{l=0}^{N-1} d(n; l)e^{-j2\pi\frac{kl}{N}}, \tag{14}$$

$$d(n; l) = \frac{1}{\sqrt{N}} \sum_{k=0}^{N-1} D(n; k)e^{j2\pi\frac{kl}{N}}$$

If the CDMA receiver 400 knows the channel responses, the estimate of D(n;k), denoted as D̂(n;k), can be estimated through equation (12) using frequency domain equalization. The estimate of d(n;k), denoted as d̂(n;k), is obtained via equation (14). By despreading the estimate:Le of the chip block sequence, d̂(n;k), the estimate of the symbol block sequence ŝ(n;k) and the high rate symbols, r̂(m) are obtained.

One of the most challenging problems in high-data rate wireless transmission is to overcome the time dispersion caused by multipath propagation. High data rate mobile radio channels in indoor or micro-cellular environment can exhibit large relative time dispersions. The characteristics of this time-varying multipath propagation channel can be estimated with the help of pilot symbols. The pilot symbols are periodically inserted within each transmitted symbol. The required frequency of pilot symbols depends on the velocity of temporal variation of the channel. The variation in channel can be estimated using channel estimation methods and equalized using a suitable equalization scheme in the receiver. The CDMA system uses frequency domain equalization to reduce complexity of the CDMA receiver 400 and exploits the use of frequency diversity. Estimating either frequency response or time response provides corresponding channel estimation. Frequency domain and time domain estimation methods are described below.

Assuming that the CDMA system has N sub-carriers and K active users, the channel H can be estimated in the frequency domain with the help of pilot symbols by solving the following equation:

$$Y(n,k)=H(n,k)D(n,k)+W(n,k)$$

where $$D(n,k) = \begin{cases} \frac{1}{\sqrt{N}} \sum_{l=0}^{N-1} \sum_{k=1}^{K} c_k(l) s_k(n) e^{\left(-j2\pi\frac{kl}{N}\right)} & \text{for dedicated pilot} \\ \frac{1}{\sqrt{N}} \sum_{l=0}^{N-1} c_p(l) s_p(n) e^{\left(-j2\pi\frac{kl}{N}\right)} & \text{for common pilot} \\ \alpha \cdot g & \text{for data dependent pilot structure} \end{cases} \quad (15)$$

It is obvious from equation (15) that the channel estimation is easier for the new packet structure proving the packet 50. But unlike the other two packet structures in which all sub-carriers consist of pilot symbols, the number of pilot sub-carriers in the new packet structure is a subset of total sub-carriers. Hence for this new packet structure, the pilot sub-carriers need to be changed from symbol to symbol such that all sub-carriers as covered as shown in FIG. 4. This needs to be repeated for several symbols and a time average has to be made. In addition, the CDMA system should know the value of α, which changes from symbol to symbol. In short, even though channel estimation using the new packet structure is easy, more time is required and prior knowledge of certain parameters is assumed.

The frequency domain response is estimated by solving the system of equation with N equations and N unknowns. However, the channel response is physically sampled in time so that the number of parameters needed to be estimated equals to the channel length (the number of major channel paths L are much less than the number of sub-carriers N). As discussed above, the spread signal received in the frequency domain is:

$$Y(n,k) = H(n,k)D(n,k) + W(n,k) \quad (16)$$
$$= \sum_{l=0}^{L-1} h(n,l) e^{\left(-j2\pi\frac{lk}{N}\right)} D(n,k) + W(n,k)$$

where all parameters are as defined in Equation (15). Here, there are N equations and there are only L unknowns (L<<N). Hence it is possible to formulate matrix equations from which the time response function of channel h(n) can be determined.

This method of frequency do:main equalizing with time response channel estimation gives a better channel estimation than the previous method with frequency response channel estimation because it virtually eliminates all noise components present above the $L^{th}$ multipath.

In frequency domain equalization, each sub-carrier component corresponding to received data is multiplied with a gain component G(k) to combine the energy of a received spread signal scattered in the frequency domain. The decision variable is determined by a despreading procedure after IFFT. Various methods for channel equalization such as maximum ratio combining, equal gain combining, orthogonality restoring combing and minimum mean square error combining are experimented for deciding the channel gain. Details of these combining methods are described below.

Maximum ratio combining (MRC)

The gain for maximum ratio combining is given by G(k)=H*(k)Y(k) MRC enables better performance for single user cases.

Equal gain combining (EGC)

The gain for equal gain combining is given by $$G(k) = \frac{H^*(k)}{|H(k)|} Y(k)$$

Orthogonality restoring combining (ORC)

For a downlink channel, the CDMA receiver can eliminate MAI completely by using orthogonality restoring combining. The gain for ORC combining can be derived as:

$$G(k) = \frac{H^*(k)}{|H(k)|^2} Y(k).$$

However, low-level sub-carriers tend to be multiplied with higher gains and noise components are amplified at weaker sub-carriers. This noise amplification effect degrades BER performance.

Minimum mean square error combining (MMSE)

Based on minimum mean squire estimation criterion, the error must be orthogonal to all baseband components of the received sub-carriers. The gain in this case can be obtained as $$G(k) = \frac{H_j^*(k)}{\sum_{j=1}^{J} |H_j(k)|^2 + \sigma_k^2} \cdot Y(k)$$

where J is the number of users. For downlink, the gain becomes small to avoid excessive noise amplification for small values of |H|k|, whereas for large H|k|, it becomes in proportion to the inverse of sub-carrier envelope H*(k)/|H (k)|² in order to recover the orthogonality among users. But the problem with this kind of equalization scheme is the calculation of noise variance $$\sigma_k^2.$$

By knowing the desired signal-to-noise ratio (SNR), some approximations on noise variance can be incorporated.

Figure 10:
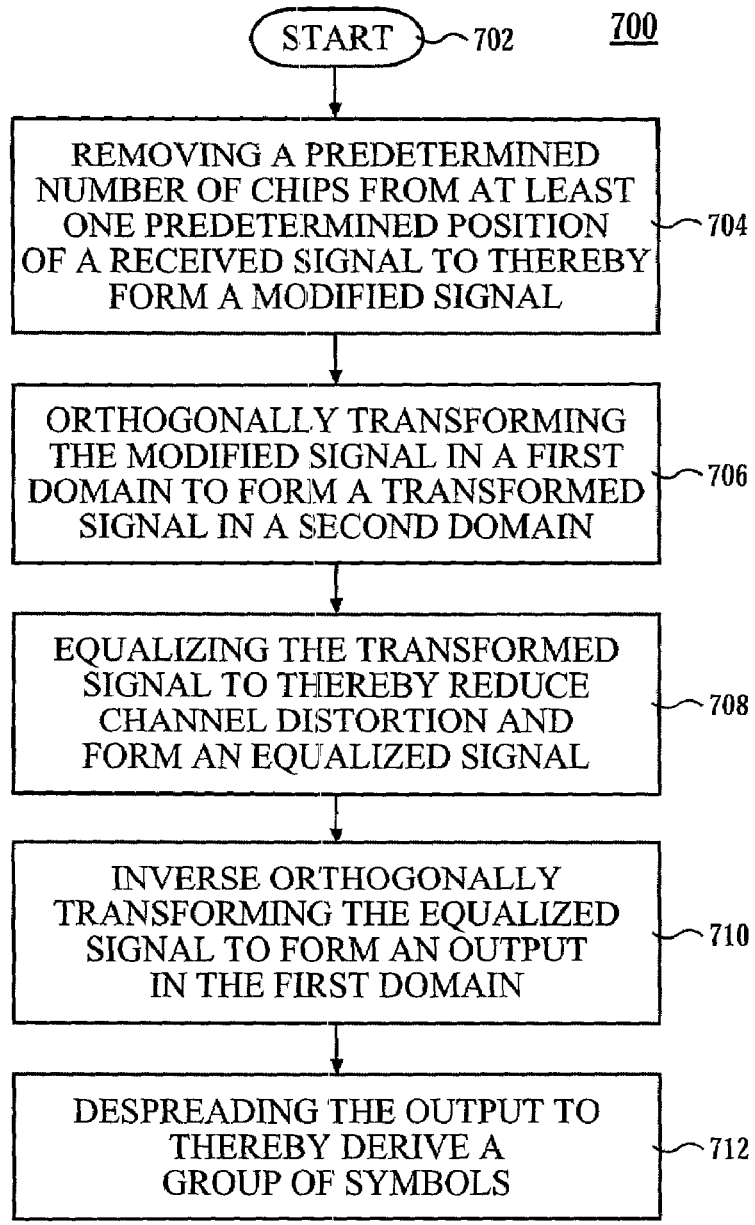
FIG. 10 is a flowchart of a method for processing a spread signal received by the CDMA transmitter of FIG. 1.

FIG. 10 is a flowchart of a method 700 for processing a received signal by the CDMA receiver 400. The method starts at step 702 and assumes that the received signal has been pulse shaped before the step 704 of removing the predetermined number of chips from at least one predetermined position of the received signal to thereby form a modified signal. The at least one predetermined position depends on the cyclic prefixing technique used to extend the N spread sequence. Hence, for cyclic prefixing technique 320, the trailing zeros are removed from the tail portion 324. As for the cyclic prefixing technique 340, the predetermined number of p chips is removed from both a head portion and a tail portion at the opposite ends 348,350 of the N spread sequence 342.

Thereafter, after the S/P converter 406 converts the modified signal into parallel, the modified signal in a first domain is orthogonally transformed to form a transformed signal in a second domain al step 706. In the preferred embodiment of the invention, the first domain is the time domain and the second domain is the frequency domain. The transformed signal is then equalized at step 708 to thereby reduce channel distortion and form an equalized signal.

The method 700 continues to step 710 for inverse transforming the equalized signal by the inverse transform block 416 to form an output in the first domain, which is the time domain in this preferred embodiment. The output is then despreaded at step 712 to thereby derive a group of symbols that is serialized by the P/S converter 420.

The CDMA system is simulated with different channel conditions and compared with the performance of other multicarrier systems. Although the systems are simulated with different number of symbols per packet, the results discussed in the following sections assume a packet size of 64 symbol blocks. For the systems with data independent (common) pilot structure, each packet consists of 4 pilot symbol blocks ($N_p$=4) fully devoted for pilot transmission and 60 data symbol blocks ($N_d$=60). Each symbol block has 16 QPSK symbols and the processing gain is selected as 32. Correspondingly, the FFT size for frequency domain equalization is N=512. A cyclic prefix of length one quarter of the OFDM block size is inserted during transmission to avoid the effect of ISI during multipath transmission. Details of simulation parameters are given in Table 1 below.

TABLE 1

| Simulation Parameters | | |
|---|---|---|
| Chip rate | | 3.84 Mcps |
| Data rate | | 180 Kbps |
| Number of subcarriers | | 512 |
| QPSK symbols/OFDM block | | 16 |
| Processing gain | | 32 |
| Multicarrier symbol interval | | 166.67 μsec |
| Symbol part duration | | 133.33 μsec |
| Guard interval duration | | 33.33 μsec (128 samples) |
| Packet length | | 64 OFDM blocks |
| No of Pilot symbols/packet | | 64 (= 4 * 16) |
| No of data symbols/packet | | 960 (= 60 * 16) |
| Modulation | SC-CDMA | QPSK + orthogonal spreading |
| | MC-CDMA | QPSK + multicarrier spreading |
| Pulse shaping | SC-CDMA | Square root raised cosine filter Roll off factor = 0.15 |
| | MC-CDMA | Nil |
| Channel model | | L-path Rayleigh fading channel |
| Spread code | Short | Orthogonal Walsh sequence |
| | Long | Long pseudo-random sequence |
| Channel estimation | | Pilot assisted time domain channel estimation |
| Equalization methods | | MRC, EGC, ORC and MMSEC in frequency domain |

For systems with data-dependant pilot structure, each symbol block consists of a combination of pilot chips and spread user data. However, the total number of pilot symbols (64) per packet remains the same as the previous case. Each symbol block has one pilot symbol (G pilot chips). The value of pilot chips changes with the symbol block and is determined from user data as discussed previously. This change can be adaptively determined.

Figure 11:
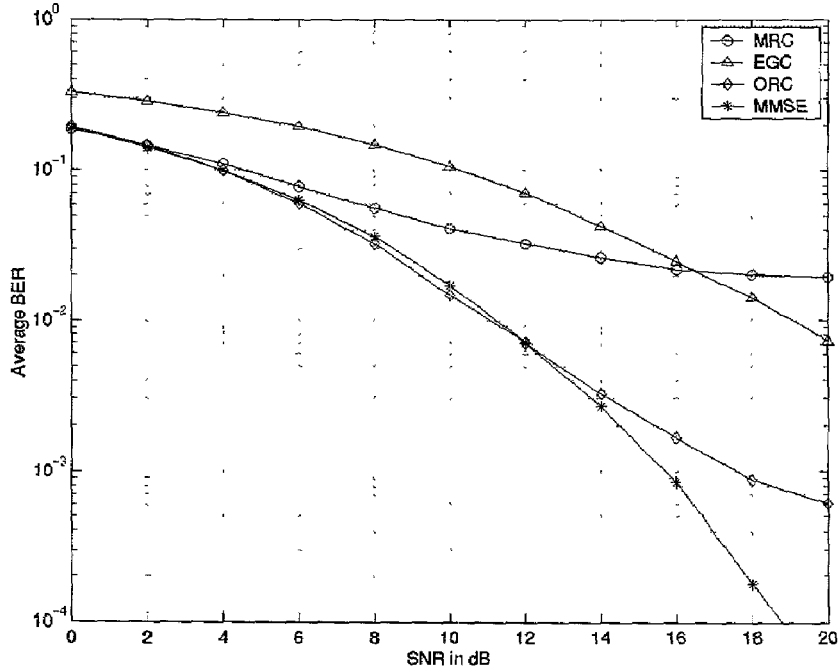
FIG. 11 is a graph showing tie effect of different channel equalization methods on the performance of the CDMA receiver of FIG. 5.

FIG. 11 is a graph 800 that shows the effect of different channel equalization methods on the performance of the CDMA receiver 400. Compared with MRC and EGC, equalization with ORC and MMSE gives better performance. The MMSE gives the best performance but requires computation of noise variance, which is not an easy task for practical system implementation. The performance results were plotted for systems with five users for a system with a processing gain, G, of 32.

Noise variance computation for MMSE equalization is difficult task for practical system implementation. Simulations were conducted for the CDMA system having MMSE equalization with fixed-noise variance and noise variance as a factor of channel power. The performance is plotted against the system having MMSE equalization with actual noise variance. The performance of the CDMA system with fixed noise variance is very close to the CDMA system with actual noise variance. The performance is better for low SNR levels when considering the noise variance as a function of channel power (it is considered as 1% of average channel power). However, for high SNR levels, the performance lags behind the other two methods. This is more significant for more users.

Figure 12:
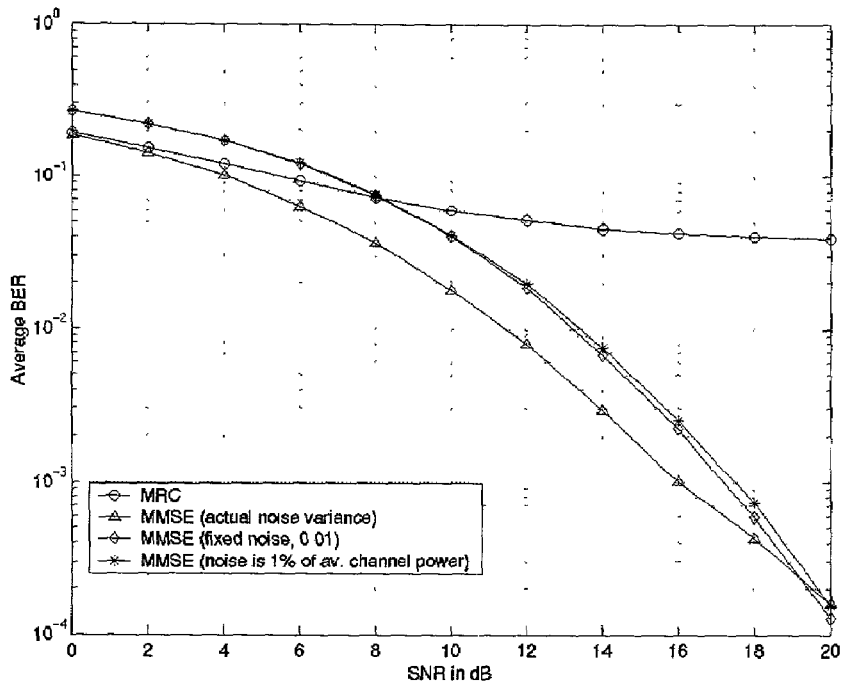
FIG. 12 is a graph showing performance of the CDMA receiver of FIG. 5 with the packet structure of FIG. 4 for different equalization schemes.

FIG. 12 is a graph 820 show big performance of the CDMA receiver 400 with the packet structure of FIG. 4 for different equalization schemes. The performance is examined for different equalization schemes such as MRC and MMSE. The MMSE scheme is tested with different noise variance factors such as actual noise variance, fixed-noise variance and noise variance as a factor of average channel power. The performance is plotted for five users. From FIG. 12, it can be seen that MMSE equalization gives a better result than MISC. However, various approximations for noise variance in MMSE affect the CDMA system performance marginally.

Figure 13:
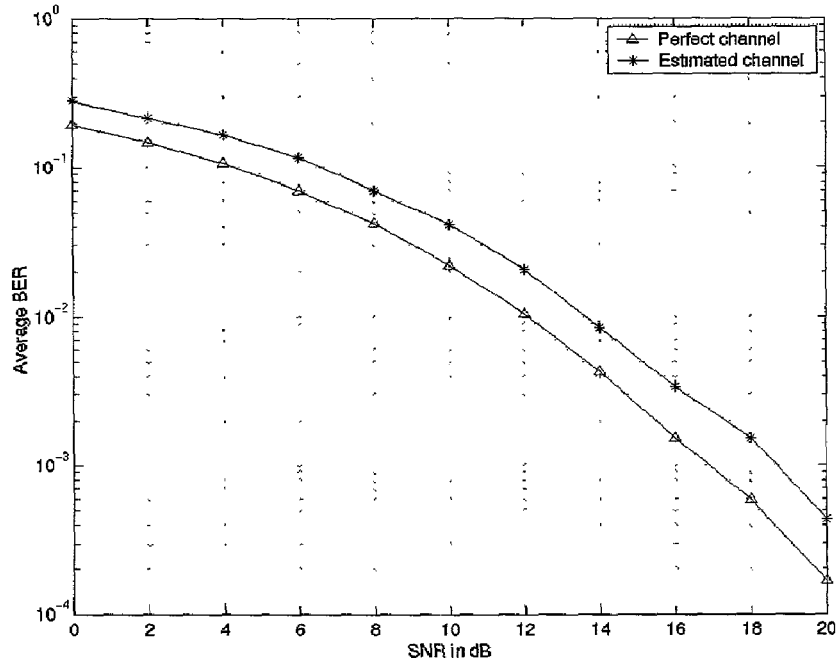
FIG. 13 is a graph showing the effect of channel estimation on the performance of the CDMA receiver of FIG. 5 with the packet structure of FIG. 4.

FIG. 13 is a graph 840 showing the effect of channel estimation on the performance of the CDMA receiver 400 with the packet structure of FIG. 4 for five users. The channel estimation for this pilot arrangement for the CDMA system is simpler because of constant pilot symbol values at the frequency domain. However, the arrangement of pilot chips within the packet 50 is novel. Pilot chips are placed at equidistant within each of the OFDM symbol block 52 and the position of the pilot chips across the packet 50 changes. This arrangement rotatively covers all the sub-carriers. As discussed before, the value of pilot chips changes from symbol to symbol. Pilot chips in the packet 50 are considered together with its value and sub-carrier position for estimating the channel. The effects due to sub-carrier fading and noise amplification can be reduced by this method. Since the channel is estimated for all sub-carriers and averaged accordingly, the differences between actual and estimated channel are minimal. MMSE equalization is used for channel equalization.

Figure 14:
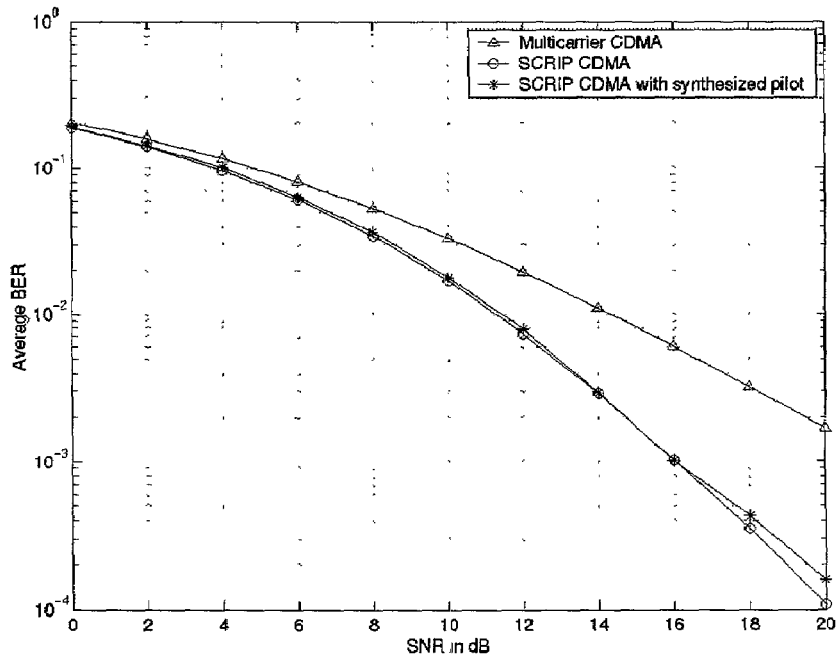
FIG. 14 is a graph comparing performance of multicarrier CDMA and the CDMA receiver of FIG. 5 with the packet structures of FIG. 3 and FIG. 4 in processing spread signals.

FIG. 14 is a graph 860 that compares the performance of a multicarrier (MC)-CDMA system and the CDMA system with the CDMA receiver 400 with and without the data-dependent pilot symbols; in processing spread signals. These systems are compared based upon identical channel conditions, and a system configuration with a processing gain of 32 and MMSE equalization at the CDMA receiver 400. The comparative performance is plotted for five users. It can be seen that the performances of the CDMA receiver 400 with and without the data-dependent pilot structure are better than the MC-CDMA. This performance improvement is more significant when SNR improves. This is more significant -when it is considered that transmission using the CDMA system overcomes some of the system design issues such as peak-to-average power ratio. Between data independent pilots and data-dependent pilots, the performance of the CDMA system with data independent pilots is marginally better. However, the CDMA system with data-dependent pilot structure gives an easy method for channel estimation and has inherent ability to overcome deep sub-carrier fading and noise amplification.

The present invention therefore provides the CDMA system having the CDMA transmitter 10, the CDMA receiver 400, a method for transmitting signals by the CDMA transmitter 10, and a method for processing a received signal received by the CDMA receiver 400 to overcome, or at least alleviate, the problems of the prior art.

It will be appreciated that although different preferred embodiments have been described in detail, various modifications and improvements can be made by a person skilled in the art without departing from the scope of the present invention.

What is claimed is:

1. A code division multiple access (CDMA) system comprising:
    at least one CDMA transmitter having:
        at least one spreader for spreading a packet having one or more blocks to derive an M×G spread sequence for each of said blocks to thereby form a spread signal, where M represents number of symbols, said number being greater or equal to one, each of said at least one spreader having a processing gain of G; and
        a sequence extender for extending each of said blocks using a predetermined number of chips to thereby form an extended spread signal, said sequence extender having an extender input coupled to said spreader output.

2. The CDMA system of claim 1, wherein said packet comprises a plurality of pilot chips.

3. The CDMA system of claim 2, wherein said plurality of pilot chips is placed together as one or more pilot blocks within said packet.

4. The CDMA system of claim 2, wherein said plurality of pilot chips is dedicated to a single user.

5. The CDMA system of claim 2, wherein said plurality of pilot chips is common to one or more users in a transmission of said extended spread signal.

6. The CDMA system of claim 2, wherein pilot chips within each of said blocks are equally spaced in a transmission of said extended spread signal.

7. The CDMA system of claim 6, wherein said pilot chips within each of said blocks are determined based upon data from said each of said blocks.

8. The CDMA system of claim 7, wherein said pilot chips is determined based upon p=A$^{-1}$(αg−Bd), where p is a pilot vector in the time domain, g is a known spreading sequence for channel estimation, d is the sum of spread data of all users, α is a scalar value based upon data in said blocks, and A and B are sub-matrices derived from Fast Fourier Transform based upon positions of p and g.

9. The CDMA system of claim 2, wherein said sequence extender is adapted to extract said predetermined number of chips from a tail portion of each of said blocks for placing in front of said each of said blocks.

10. The CDMA system of claim 2, wherein said sequence extender is adapted to extract said predetermined number of chips from a head portion and a tail portion of each of said blocks, said predetermined number of chips from said head portion being placed behind said tail portion and said predetermined number of chips from said tail portion being placed behind said tail portion.

11. The CDMA system of claim 2, wherein said sequence extender is adapted to insert said predetermined number of chips as zeros after each of said blocks.

12. The CDMA system of claim 2, wherein said sequence extender is adapted to insert said predetermined number of chips as zeros before and after each of said blocks.

13. The CDMA system of claim 1, wherein said CDMA transmitter fisher comprises a combiner having a combiner input and a combiner output, said combiner input being coupled to said spreader output of each of said at least one spreader, said combiner output being coupled to said extender input.

14. The CDMA system of claim 1, wherein said transmitter further comprises a pulse shaper, coupled to output of said sequence extender.

15. A method for transmitting signals in a code division multiple access (CDMA) system, said method comprising the steps of:
    spreading, by at least one spreader, a packet having one or more blocks to derive an M×G spread sequence for each of said blocks to thereby form a spread signal, where M represents number of symbols, said number being greater or equal to one, each of said at least one spreader having a processing gain of G; and
    extending, by a sequence extender, said M×G spread sequence using a predetermined number of chips to thereby form an extended spread signal, said M×G spread sequence being received from a spreader output of each of said at least one spreader.

16. The method of claim 15, and further comprising the step of multiplexing a plurality of pilot chips with data of said packet before said spreading step.

17. The method of claim 16, wherein said multiplexing step comprises the step of placing said plurality of pilot chips together as one or more pilot blocks within said packet.

18. The method of claim 16, wherein said multiplexing step comprises the step of dedicating said plurality of pilot chips to a single user.

19. The method of claim 16, wherein said multiplexing step comprises the step of setting said plurality of pilot chips to be common to one or more users in a transmission of said extended spread signal.

20. The method of claim 15, and further comprising the step of determining pilot chips for each of said blocks after said spreading step and before said extending step, said pilot chips being based upon data from said each of said blocks.

21. The method of claim 20, wherein said determining step comprises the step of multiplexing said pilot chips to be equally spaced within said each of said blocks.

22. The method of claim 20, wherein said determining step comprises the step of determining said pilot chips based upon p=A$^{-1}$(αg−Bd), where p is a pilot vector in the time domain, g is a known spreading sequence for channel estimation, d is the sum of spread data of all users, α is a scalar value based upon data in said blocks, and A and B are sub-matrices derived from Fast Fourier Transform based upon positions of p and g.

23. The method of claim 15, wherein said extending step comprises the step of extracting said predetermined number of chips from a tail portion of each of said blocks for placing in front of said each of said blocks.

24. The method of claim 15, wherein said extending step comprises the step of extracting said predetermined number of chips from a head portion and a tail portion of each of said blocks, said predetermined number of chips from said head portion being placed behind said tail portion and said predetermined number of chips from said tail portion being placed behind said tail portion.

25. The method of claim 15, wherein said extending step comprises the step of inserting said predetermined number of chips as zeros after each of said blocks.

26. The method of claim 15, wherein said extending step comprises the step of inserting said predetermined number of chips as zeros before and after each of said blocks.

27. The method of claim 15, wherein said spreading step comprises the step of combining output from said at least one spreader.

28. The method of claim 15, and further comprising the step of pulse shaping said M×G spread sequence after said extending step.

29. A code division multiple access (CDMA) system comprising:
at least one CDMA receiver for processing a received signal, said CDMA receiver having:
a sequence extension remover for removing a predetermined number of chips from at least one predetermined position of said received signal to thereby form a modified signal;
an orthogonal transform block, coupled to said sequence extension remover, for transforming said modified signal in a first domain to form a transformed signal in a second domain;
an equalizer block, coupled to said transform block and having a channel estimator, for equalizing said transformed signal to thereby reduce channel distortion and form an equalized signal:
an inverse orthogonal transform block, coupled to said equalizer block, for inverse transforming said equalized signal to form an output in said first domain; and
a despreader for despreading said output to thereby derive a group of symbols.

30. The CDMA system of claim 29, wherein said at least one predetermined position comprises a front portion of each of one or more blocks of said received signal.

31. The CDMA system of claim 29, wherein said at least one predetermined position comprises a tail portion of each of one or more blocks of said received signal, wherein said sequence extension remover adds said tail portion to a starting portion of said each of one or more blocks, said starting portion having the same number of chips as said tail portion.

32. The CDMA system of claim 29, wherein said at least one predetermined position comprises a head portion and a tail portion of each of one or more blocks of said received signal.

33. The CDMA system of claim 29, wherein said at least one predetermined position comprises a front portion and a tail portion of each of one or more blocks of said received signal, wherein said sequence extension remover adds said tail portion to a portion of said each of one or more blocks, said portion having the same number of chips as said tail portion and starts immediately after said front portion in said each of one or more blocks.

34. The CDMA system of claim 29, wherein said orthogonal transform block comprises a Fast Fourier Transform block, further wherein said first domain is the time domain and said second domain is the frequency domain.

35. The CDMA system of claim 34, wherein said inverse orthogonal transform block comprises an inverse Fast Fourier Transform block.

36. The CDMA system of claim 29, wherein said spread signal comprises a plurality of pilot chips.

37. The CDMA system of claim 36, wherein said spread signal is a transmission to one or more users, said plurality of pilot chips being common to said one or more users.

38. The CDMA system of claim 36, wherein said spread signal is a transmission to one or more users, said plurality of pilot chips being equally spaced within each of one or more blocks of said spread signal.

39. A method for processing a received signal received in a code division multiple access (CDMA) system, said method comprising the steps of:
removing a predetermined number of chips from at least one predetermined position of said received signal to thereby form a modified signal;
orthogonally transforming said modified signal in a first domain to form a transformed signal in a second domain;
equalizing said transformed signal to thereby reduce channel distortion and form an equalized signal;
inverse orthogonally transforming said equalized signal to form an output in said first domain; and
despreading said output to thereby derive a group of symbols.

40. The method of claim 39, wherein said removing step comprises the step of removing said predetermined number of chips from a front portion of each of one or more blocks of said received signal.

41. The method of claim 39, wherein said removing step comprises the steps of:
removing said predetermined number of chips from a tail portion of each of one or more blocks of said received signal; and
adding said tail portion to a starting portion of said each of one or more blocks, said starting portion having the same number of chips as said tail portion.

42. The method of claim 39, wherein said removing step comprises the step of removing said predetermined number of chips from a head portion and a tail portion of each of one or more blocks of said received signal.

43. The method of claim 39, wherein said removing step comprises the steps of:
removing said predetermined number of chips from a front portion and a tail portion of each of one or more blocks of said received signal; and
adding said tail portion to a portion of said each of one or more blocks, said portion having the same number of chips as said tail portion.

44. The method of claim 39, wherein said orthogonally transforming step comprises the step of orthogonally transforming from the time domain as said first domain to the frequency domain as said second domain being.

45. The method of claim 44, wherein said inverse orthogonally transforming step comprises the step of inverse orthogonally transforming from the frequency domain to the time domain.

* * * * *

UNITED STATES PATENT AND TRADEMARK OFFICE
CERTIFICATE OF CORRECTION

PATENT NO. : 7,099,299 B2  
APPLICATION NO. : 10/090370  
DATED : August 29, 2006  
INVENTOR(S) : Ying-Chang Liang et al.

Page 1 of 1

It is certified that error appears in the above-identified patent and that said Letters Patent is hereby corrected as shown below:

Column 20, Line 5, delete "fisher" and substitute therefor -- further --

Signed and Sealed this

Twenty-seventh Day of March, 2007

JON W. DUDAS  
*Director of the United States Patent and Trademark Office*